June 21, 1949.                    A. SILVERA                    2,474,069
FOOD FREEZING TUNNEL
Filed March 16, 1945
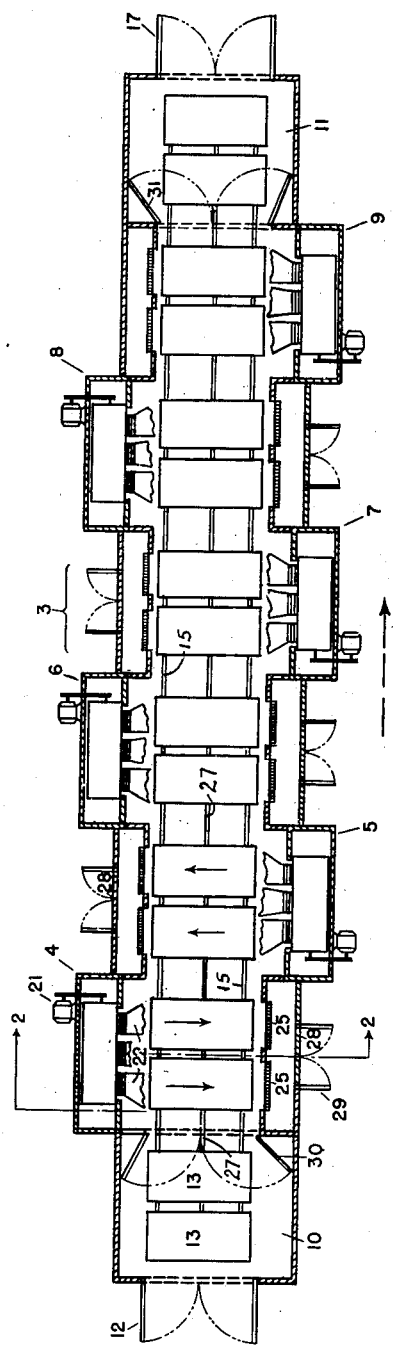
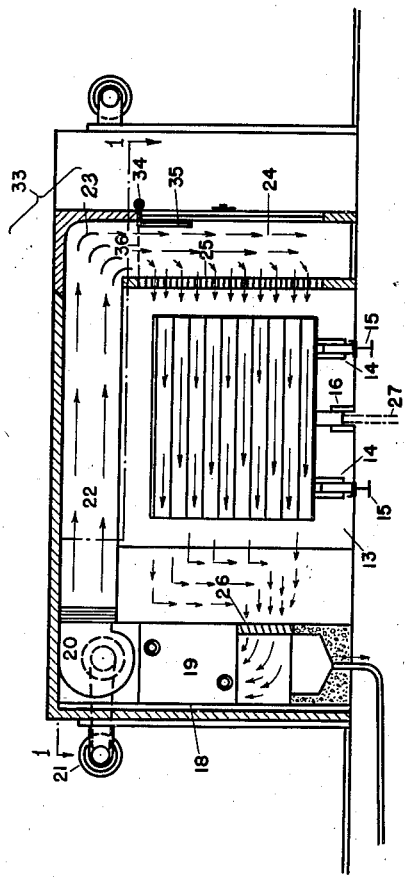
INVENTOR.
America Silvera
BY
attorney

Patented June 21, 1949

2,474,069

UNITED STATES PATENT OFFICE 2,474,069

FOOD FREEZING TUNNEL

Americo Silvera, Syracuse, N. Y., assignor to Carrier Corporation, Syracuse, N. Y., a corporation of Delaware Application March 16, 1945, Serial No. 583,125

3 Claims. (Cl. 62—102)

This invention relates to methods of and means for freezing food and other products.

The general object of the invention is to provide a simple, economical, and highly flexible system of freezing products of different kinds, more particularly food products, employing a minimum of equipment, adapted to be variously arranged to suit a plurality of different freezing needs.

A feature of the invention resides in the provision of a series of units, arranged to be positioned to form a multistep freezing system. Each unit may be in the nature of a self-contained apparatus, while the combination of a plurality of units, individually controlled to produce and maintain desired temperature conditions, results in a complete system for handling almost every type of food produce requiring freezing.

Another feature of the invention consists in the arrangements of unitary apparatus in combination with the distribution of air supplied by such apparatus so that an area, in the nature of a tunnel, is provided for housing a rack or truck containing produce to be frozen. By juxtapositioning a plurality of such units, a tunnel of desired length is provided. Since each of the units may be operated to provide a predetermined condition, the movement of a truck through the tunnel will subject the produce thereon to a series of air conditions, as may be desired, in order best to promote the freezing operation.

Another feature of the invention resides in the use of substantially standard cold diffuser equipment arranged most economically to recirculate air in a substantially closed circuit. Air distribution means assure the routing of such air through produce positioned in the path of their movement.

A further feature covers the use of air conditioned by such apparatus in a storage area served by the apparatus, apart from the area within the apparatus employed primarily for produce freezing.

Another feature covers the positioning of circulating units in side by side relationship so that the movement of air in one unit will be in a direction opposite to that in the other unit with the result that produce conveyed through a series of such units will be uniformly treated and the produce frozen equably throughout.

These and other features will be more apparent from the following description of one form of the invention to be read in connection with the accompanying drawing, in which Fig. 1 is a diagrammatic illustration, partly in plan and partly in section of my arrangement;

Fig. 2 is a diagrammatic view, in section, on the lines 2—2 of Fig. 1.

Considering the drawing, similar designations referring to similar parts, numeral 3 generally designates a freezer arrangement including unit enclosures 4, 5, 6, 7, 8 and 9. It will be apparent that although six unit enclosures are illustrated, any number may be employed, depending upon the use to which my system will be put. Ante-rooms 10 and 11 are positioned at both ends of the series of unit enclosures, as shown in Fig. 1. Although the enclosures may be individually constructed, and separable, in some instances it may be desirable to have the wall and ceiling elements joined together in a continuous permanent structural arrangement. For purposes of the invention, it will be considered that each of the enclosures and ante-rooms is a separate unit which may be shifted as desired so that the arrangement may be shortened or lengthened depending upon different requirements. It will be understood the various individual units may be connected together by any suitable means, if desired, when they are disposed in juxtaposition to one another, and, preferably, are sealed to separate the passageways provided thereby from the surrounding area.

Ante-room 10 is provided with doors 12 through which food conveyor trucks 13 are admitted to the ante-room. Trucks 13, as shown in Fig. 2, are provided with trolley wheels 14 adapted to run on rails 15; each truck 13 is equipped with a guide and tow attachment 16, which may be in the form of a conveyor attachment or otherwise, adapted to engage the sprocket chain of a conventional conveyer 27; conveyer 27 may be suitably actuated by any desired means. Attachments 16 secure the trucks 13 to conveyor 27; movement of conveyor 27 moves each truck 13 from one end of arrangement 3 to the other, emerging at the far end through doors 17. Each of the unit enclosures 4—9 is equipped with a cold diffuser 18, preferably in self-contained unitary form. The cold diffuser equipment includes a refrigerant coil housing 19 containing one or more rows of coil surface in which refrigerant, adapted to be expanded therein, is supplied from a central refrigeration system, not shown. Air leaving housing 19 is at a desirable low temperature, depending upon the refrigeration controls employed and assuming, of course, that adequate refrigeration capacity is available. This air enters fan 20, driven by motor 21 mounted on the side of the unit enclosure, through a suitable drive. The air is discharged into distributing duct 22 within which are positioned, if desired, flow vanes 23 for assuring equal distribution of the air throughout different portions of the supply duct. The air is delivered to the opposite end of the enclosure, into a plenum chamber 24 one side of which is equipped with diffusion grilles 25. The diffusion grilles serve to distribute the air substantially uniformly over the whole discharge area from plenum chamber 24 with the result that every rack in food conveyor 13 positioned within the unit is subjected to a flow of air therethrough which is then returned for reconditioning through intake grille 26. Thus, a compact recirculating system is provided, with a minimum flow path, so that losses due to dissipation are held to a negligible percentage. The air leaving the cold diffuser is delivered substantially at its discharge temperature to the produce on the food truck. In this case, it should be noted that motor 21 for driving the fan 20, is located outside the unit so that the heat generated therefrom will not be imparted to the air stream.

The rate of advance of a series of food trucks through the tunnel freezer arrangement 3 formed by the combination of unit enclosures 4—9 may be suitably controlled. Thus, the towing of food conveyor trucks may be on an intermittent time schedule with a pre-determined period of time in each enclosure, or a slow moving continuous passage may be provided.

The cold diffuser in unit 4 delivers air in the direction shown by the arrows while the air discharged in unit 5 flows in the opposite direction; and similarly a reversal in flow is provided in alternate units. In consequence, the produce on conveyor trucks will not have one end continuously subjected to the first impact of conditioned air but instead will have the opposite ends alternately subjected to the first flow of air thus assuring greater uniformity in the treatment of the produce, regardless of position on the racks of the trucks.

Each unit enclosure has an entrance 28 suitably equipped with doors 29 so that a service man may readily enter each enclosure for inspection and repair.

In practice, one or more trucks will be admitted through doors 12, assuming the direction of travel is from left to right, as indicated by the broken arrow in the illustrated arrangement. After entering ante-room 10, the trucks will pass through doors 30 and assume a position in the tunnel area within unit 4.

Assuming quick freezing action of produce is desired, air at a temperature on the order of —40° F. will be supplied by fan 20, and such low temperature air will be rapidly circulated to the produce on trucks 13 as shown by the arrows in Fig. 2. Speedy freezing to desirable low temperature will thus be achieved at a rapid rate to avoid the formation of undesirable large crystals. After a suitable interval, the trucks from enclosure 4 will move into enclosure 5 and there be subjected to a rapid circulation of air delivered at a predetermined temperature, say —30° F. In particular, the temperature of air delivered in enclosure 5 need not be as low as that delivered in enclosure 4 since the essential quick freezing will have progressed to the point where a somewhat higher temperature may satisfactorily be used in this second step for producing an interior frozen condition on the order of zero to —10° F. which is an acceptable storage range for most products.

As the trucks proceed through units 6, 7, 8 and 9 the temperature of the air delivered in each enclosure may be set to assure a final frozen condition of the produce required for optimum storage. This condition is reached in enclosure 9 whereupon the trucks proceed into exit anteroom 11 through doors 31 and then emerge into the area beyond exit doors 17.

If desired, applicant's tunnel arrangement may be positioned within a larger storage area so that in practice the trucks after emerging from the tunnel may be unloaded directly within the storage area without subjecting the produce to any intervening temperature higher than that desired for good storage. To this end, applicant provides hinged portion 33 shown in Fig. 2. By swinging said hinged portion or section about pivot 34, it will be brought to rest against the side of the unit enclosure with damper 35 in cutoff position 36 so that the air then delivered by the cold diffuser will be discharged into the storage area surrounding the unit.

The use of individual cold diffusers in each separate unit enclosure enables each coil section to be separately defrosted without regard to the coil sections in other units.

Thus, for example, the coil of unit 9 may be defrosted by the use of water, brine, hot gas, or other method, without in any way interfering with the operation of the cold diffusers in the other units. This enables substantially continuous operation since it is possible to carry on different stages of the freezing operation at all times even though one or more units require defrosting and are removed from service.

The same applies to cases in which a breakdown of one unit occurs. If the operation of one unit is impaired the other units will continue to operate, the only variation occurring in the length of stay of the food truck in the units left operating.

While the structural details of the units and their interpositioning form no part of the invention, it will be understood that suitable insulated wall structures, and methods of connecting together of units, sealing the same to assure airtightness, proper provision for truck guiding and towing, etc., will suggest themselves to those skilled in the art. Since such details of design and modification of parts may be employed without departing from the spirit of the invention, it is intended that no limitations be read into the invention or the scope thereof except such as are definitely included in the appended claims.

I claim:

1. In a combination of apparatus of the character described, an enclosure, said enclosure having a floor, ceiling and sides, means disposed at one side of the enclosure housing a cold diffusing apparatus, a distributing duct adjacent the ceiling area for conveying air from the cold diffuser apparatus, a plenum at a side of the enclosure opposite the cold diffuser apparatus, one of the sides of the enclosure forming a side of the plenum, a diffuser grille forming the opposite side of the plenum diffusing air from the plenum into the area formed by said apparatus, duct and plenum, said area constituting a tunnel, and means for conveying food to be frozen through said tunnel.

2. In a system for freezing materials, the combination of a plurality of freezing units, each unit having a passageway therethrough, the series of passageways forming a tunnel, each unit having a floor, ceiling and sides and including means disposed at one side of each unit housing separate cold diffusing apparatus, a distributing duct adjacent the ceiling area of each unit for conveying air from the cold diffusing apparatus, a plenum chamber at a side of each unit opposite the cold diffusing apparatus, means for diffusing air from the plenum chamber into the area formed by the cold diffusing apparatus, duct and chamber, means for conveying food to be frozen through the tunnel and means for disposing a section of a unit so that in a first position air from the diffusing apparatus will be routed to the tunnel and then to the coil of the diffuser while in a second position air from the cold diffuser will be routed to an area surrounding the system for cooling the same.

3. In a system for freezing foods, the combination of a series of separate, self-contained cooling units in juxtaposition with respect to one another, and each unit having a passageway therethrough, the series of passageways forming a continuous tunnel, each of said units being adapted to supply air at a desired low temperature within a portion of the tunnel and including means disposed at one side of each unit housing separate cold diffusing apparatus, a plenum at a side of each unit opposite the cold diffusing apparatus, a distributing duct for conveying air from the cold diffusing apparatus to the plenum. a fan for withdrawing air from the passageway and for passing such air through the cold diffusing apparatus and the duct to the plenum, and means for diffusing air from the plenum into the passageway, the direction of air flow in one unit being different from the direction of flow in the adjacent unit, and means for conveying foods through the tunnel.

AMERICO SILVERA.

REFERENCES CITED

The following references are of record in the file of this patent:

UNITED STATES PATENTS

| Number | Name | Date |
| --- | --- | --- |
| 1,930,414 | Buhr | Oct. 10, 1933 |
| 2,136,969 | Downey | Nov. 15, 1938 |
| 2,237,256 | Finnegan | Apr. 1, 1941 |
| 2,237,257 | Finnegan | Apr. 1, 1941 |
| 2,265,858 | Reynoldson | Dec. 9, 1941 |
| 2,300,229 | Knowles | Oct. 27, 1942 |
| 2,382,084 | Mathews | Aug. 14, 1945 |